United States Patent Office 3,181,391
Patented May 4, 1965

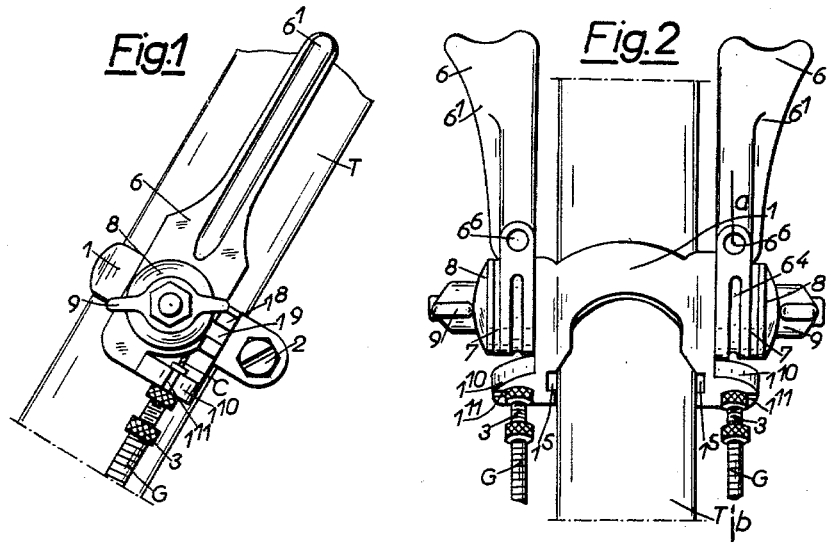
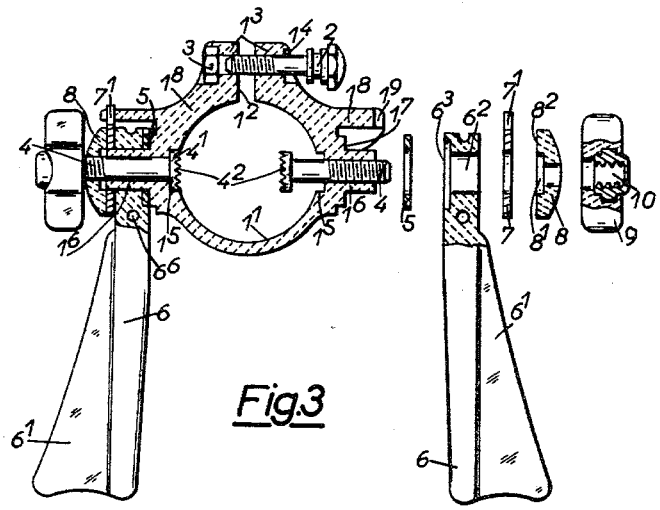
Fig.1 Fig.2 Fig.3

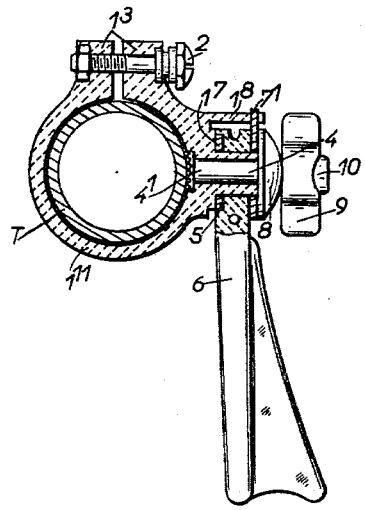
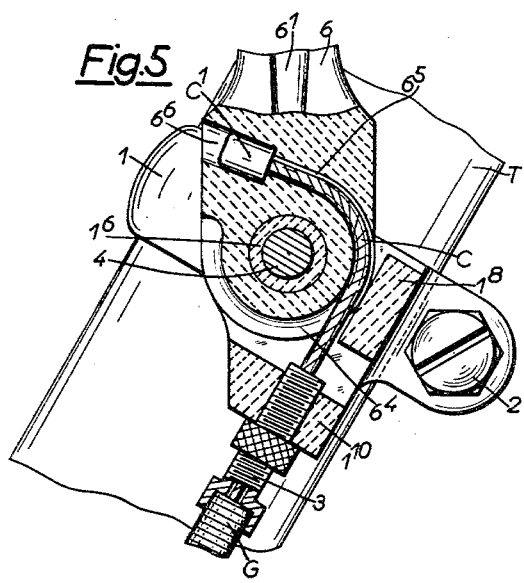

3,181,391
CONTROL LEVER DEVICES
Lucien Charles Hippolyte Juy, 75 Rue General Fauconnet,
Dijon, Cote d'Or, France
Filed Mar. 20, 1963, Ser. No. 266,726
Claims priority, application France, Apr. 20, 1962,
8,428
5 Claims. (Cl. 74—531)

This invention relates to control lever devices for bicycles, tandems, motorized bicycles, motor bicycles and similar vehicles.

It is an object of the invention to provide improvements in control lever devices of the aforementioned kind.

According to the invention there is provided a control lever device for a bicycle and like vehicles, comprising a clamping collar for mounting on the frame of the vehicle, pivot means mounted on and protruding from said collar, a control lever having a transverse bore for mounting said control lever for rotation about the axis of said pivot means, said pivot means including members having bearing surfaces of metal and bearing surfaces of synthetic plastic material, and said members being disposed with the metal surfaces in bearing relationship with the synthetic plastic surfaces.

For a better understanding of the inveniton and to show how the same may be carried into effect, reference is now made, by way of example, to the accompanying drawings in which:

FIGURE 1 is an elevational view of a control lever device comprising two control levers mounted on a frame member of a bicycle;

FIGURE 2 is a front view corresponding to that of FIGURE 1;

FIGURE 3 is a plan view of the control lever device, one of the levers being shown in exploded view illustrating its securing members;

FIGURE 4 is a plan view of a control lever device having only one control lever;

FIGURE 5 is a view, drawn to a larger scale, taken along the line $a$–$b$ of FIGURE 2.

Referring to the drawings there is shown a control lever device mounted on a clamping collar 1 adapted to be secured on a frame member T of a bicycle. The collar 1 is formed with a longitudinal slot $1^2$. Clamping lugs $1^3$ are disposed on each side of the slot $1^2$, the lugs $1^3$ being formed with aligned holes adapted to receive a metal bolt 2 which engages with a nut 3 embedded in a polygonal recess formed in one of the lugs. The other lug is formed with a circular recess $1^4$ which is arranged to receive the base of the head of the bolt 2.

The inner surface $1^1$ of the collar 1, perpendicular to the slot $1^2$, is formed over its entire height with grooves $1^5$ which are located diametrically opposite each other. The external surface of the collar 1 is formed with two cylindrical bosses constituting bearing surfaces $1^6$ which project radially outwardly from the collar 1 and whose axes are coincident. The axes of these bearing surfaces also lie in the same plane as the plane containing the grooves $1^5$.

Adjacent to each bearing surface $1^6$ on the side thereof nearest the clamping bolt 2, the collar is formed with an outwardly projecting lug $1^8$. The lugs $1^8$ are rectangular in cross-section and extend substantially parallel to the bearing surfaces $1^6$ and at their free ends are formed with slots $1^9$ which extend transversely to the axis of the collar.

Below each bearing surface $1^6$ there is disposed a downwardly projecting lug $1^{10}$, which extends at an angle, to form a tongue which extends towards the side of the collar upon which the lugs $1^3$ are located. The tongues of the lugs $1^{10}$ are formed with screw-threaded apertures arranged to receive adjustment screws 3 which constitute adjustable abutments for sheets G, of control cables C. The lugs $1^{10}$ are formed with slots $1^{11}$ which open outwardly and are intended for the passage of the cables in the absence of screws 3.

The cylindrical bearing surfaces $1^6$, are formed with holes which extends transversely to the longitudinal axis of the collar 1. Each hole coincides with one of the grooves $1^5$ and is arranged to receive the screw-threaded stem of a metal pin 4 serving for the mounting of a control lever 6.

The pins 4 have head portions $4^1$ which are adapted to be engaged in the grooves $1^5$. The surface of each head portion $4^1$ remote from the stem thereof is concave and is formed with striations $4^2$ enabling it to grip the frame member T.

During the assembly of the collar, the head portions $4^1$ of the pin 4, which are made of treated steel, project into the bore $1^1$ and these head portions with their striations $4^2$ bear against the frame member T. The clamping force exerted, when the metal bolt 2 draws the lugs $1^3$ together, causes the striated portions $4^2$ of the pins 4 to be held tightly against the frame member T and consequently lock the collar 1 against angular movmeent around the frame member T.

The cylindrical bearing surfaces $1^6$, are formed externally with increased diameter portions $1^7$ which form a shoulder or abutment surface for metal washers 5 which are disposed on the bearing surface $1^6$.

A control lever 6 having an aperture $6^2$ formed therein is axially centered on each bearing surface $1^6$. Each control lever 6 is formed with an axial recess $6^3$ to permit engagement of the metal washer 5.

The control levers 6 are identical and at their bases are rounded. From the rounded base each lever 6 extends so as to constitute the profile of the lever proper with a reinforcement $6^1$, providing for a wide bearing surface.

The manipulation of the lever 6 is facilitated by the notched profile of the free end, the lever 6 being manipulated by the index finger while the thumb bears on the notched profile of the lever.

The free end of each of the bearing surfaces $1^6$ projects beyond the lever 6, and on this projecting portion there is located a washer 7 having on its periphery, a radially extending finger portion $7^1$. Each finger $7^1$ is arranged to engage in the corresponding slot $1^9$ in each lug $1^8$ so that rotational movement of each washer 7, bearing against on the lever 6, is prevented.

Each pin 4 projects beyond the free end of the bearing surface $1^6$ and is adapted to receive a friction washer 8. This washer 8, is dome-shape on the outer side while the inner side is formed with an axially raised annular surface $8^2$ providing an internal recess $8^1$ corresponding to the end of the bearing surface $1^6$. This joint increases the natural elasticity of the material, so that it is unnecessary to use resilient friction washers.

A simple nut or a wing nut 9, screwed onto the free end of each pin 4, bears against the domed surface of the washer 8 and permits adjustment of a transverse friction force against the control lever 5.

The wing nut 9 is made of a synthetic plastic material having, within it, a metal nut 10 which is incorporated during the moulding process.

The force exerted by the wing nut 9 is transmitted through the agency of the plastic washer 8 which exerts a resilient force on the metal washer 7. The washer 7, which is prevented from rotation by engagement of its finger $7^1$ in the slot $1^9$ of the lug $1^3$, exerts a flexible and adjustable pressure on the lever 6, providing a braking effect on the rotation of the lever 6 by means of a slight degree of crushing. On its opposite side, the said lever abuts the metal washer 5 constituting a wide and rigid support surface.

Referring now to FIGURE 4, there is here shown an assembly which has only one control lever. This assembly is provided with a collar $1^{11}$ supporting a control lever 6. In this case, the said collar is externally provided on only one side with bearing surface $1^6$ and a corresponding pin 4.

A peripheral groove $6^4$ is formed in the rounded surface of each lever 6 and extends around part of the periphery thereof. This groove $6^4$ communicates with an intermediate passageway $6^5$ which opens out into an aperture $6^6$ having a greater diameter than the passageway $6^5$. The aperture $6^6$ is arranged to receive one end C′ of a cable C in such a manner that movement of the lever 6 will cause the effective length of the cable C to be shortened or lengthened so that the cable C is displaced within its sheath G which latter is held in the hollow screw 3 disposed within the tongue of the lug $1^{10}$. The cable C is thus wound onto the groove $6^4$ of the lever 6 in a flexible manner.

At its other end the cable C is coupled to a speed change-gear device or other movable element of the bicycle such as a braking device.

According to the present invention the control lever 6, the collar 1, the resilient washer 7 and the nut 9 are made from synthetic plastic materials which may or may not be reinforced with metallic inserts.

Due to the collar 1 being made of a synthetic plastic material it can be opened sufficiently, without fracture and without deformation to enable it to be sprung onto the frame member T.

With a device as hereinbefore described there is:

(1) A diminution in the risk of corrosion by the elimination of metal elements,
(2) A reduction in weight,
(3) Silent operation,
(4) A more gentle manipulation and less chance of wear.

It is to be realized from the preceding disclosure that the invention is in no way limited to the specific embodiments shown, on the contrary it covers all variants lying within the scope and spirit of the inveniton as defined in the appended claims.

The synthetic plastic material to be employed in the above described device may be an acetal polymer such as for instance a homopolymer acetal resin.

I claim:

1. A control lever device for a bicycle and like vehicles, comprising a clamping collar adapted for mounting on the frame of the vehicle, pivot means on and protruding from said collar, a control lever having a transverse bore, said control lever being mounted on said pivot means for rotation on said pivot means, and retaining means on said pivot means and engaging the control lever with adjustable force to vary the degree of freedom of pivotal movement of the control lever on the pivot means, said collar being constituted of synthetic plastic material, said pivot means including a radially extending boss on said collar, said retaining means comprising a metal pin extending through said boss and protruding from the radially outer end of said boss, a first metal washer mounted on the boss at the side of said lever remote from the collar, a resilient washer constituted of synthetic plastic material on said pin, said resilient washer having an axially raised annular portion which abuts said first washer, said pin including a portion which extends beyond the said boss which is screw-threaded, a nut threadedly engaged on the threaded portion of the pin retaining the lever and first washer on the boss of the collar through the intermediary of the resilient washer, said first washer including a radial finger, said collar including a projecting lug, said lug having a slot, said finger being engaged in said slot to prevent said first washer from rotating around the boss.

2. A control lever device as claimed in claim 1 wherein said collar has an inner surface with a recess therein, said pin including a head portion accommodated in said recess, said head portion having striations which are adapted to grip the frame member when the collar is calmped around the frame member thereby preventing angular movement of the collar around the frame member.

3. A control lever device as claimed in claim 2, wherein said control lever has an axial recess, the retaining means further comprising a second washer on said boss accommodated in the recess in the control lever, said boss having a shoulder formed on the external surface of the collar, the second washer being between the said shoulder and the control lever.

4. A control lever device as claimed in claim 3, wherein said control lever is provided with a groove, an intermediate passageway and an aperture, said groove extending partially around said bore in said control lever and communicating with said intermediate passageway which in turn opens out into said aperture, said device including a cable with a head portion, said aperture having the head portion of the cable disposed therein, the cable extending through the intermediate passageway and around said groove.

5. A control lever device as claimed in claim 3, including a sheath disposed around said cable, a supporting member integral with said collar and including a screw-threaded portion, and an adjustable hollow screw in said screw-threaded portion of said supporting member arranged to engage the sheath of the cable.

References Cited by the Examiner
UNITED STATES PATENTS

| | | | |
|---|---|---|---|
| 1,088,595 | 2/14 | Larkin | 74—531 X |
| 2,583,609 | 1/52 | Souhart | 74—489 |
| 2,964,341 | 12/60 | Doyle et al. | 287—101 |

FOREIGN PATENTS

| | | |
|---|---|---|
| 992,297 | 7/51 | France. |
| 685,427 | 1/51 | Great Britain. |

BROUGHTON G. DURHAM, *Primary Examiner.*

MILTON KAUFMAN, *Examiner.*